March 31, 1936.    S. GOTTLIEB    2,036,038
HYDRAULIC BRAKE SYSTEM
Filed July 17, 1934
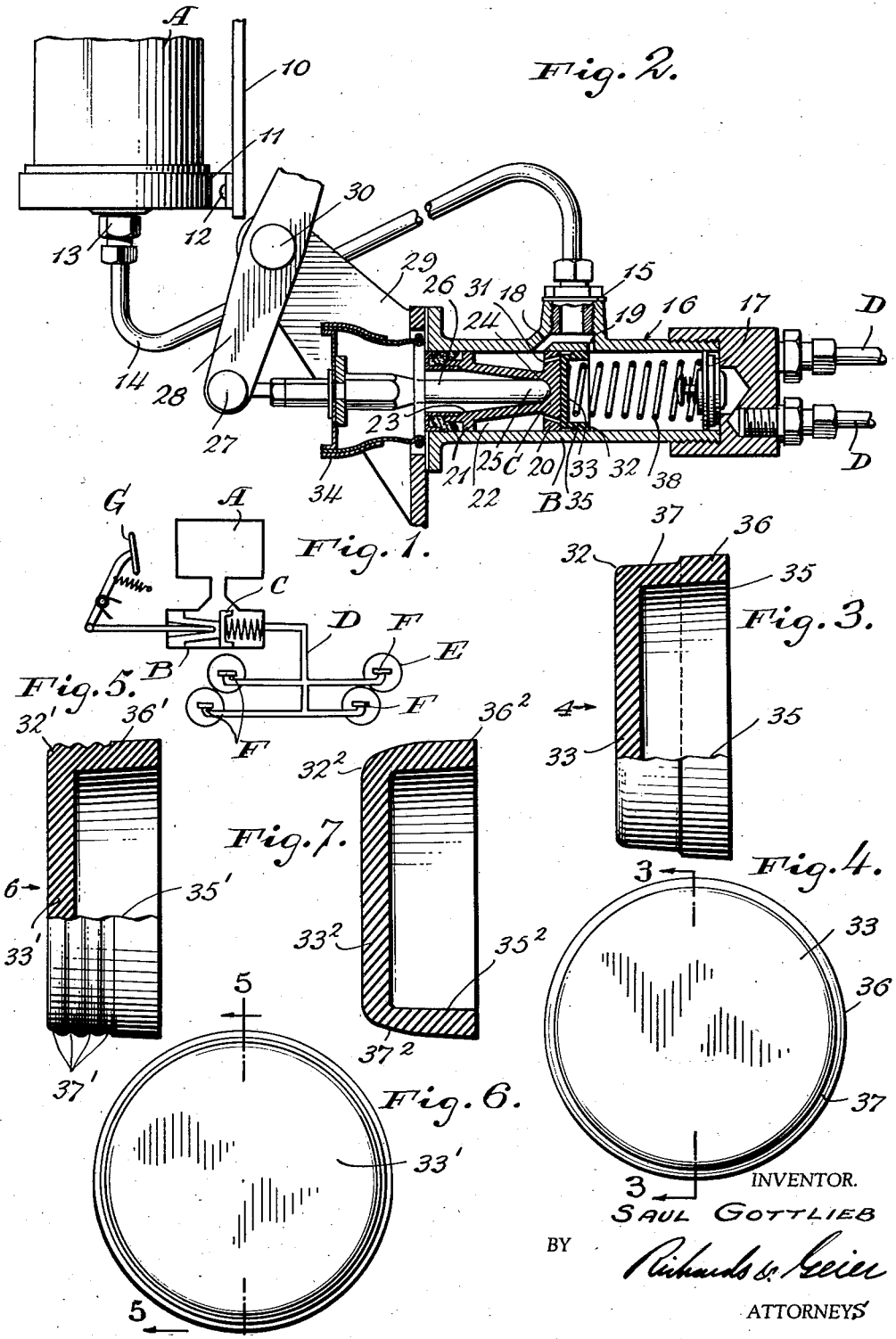
INVENTOR.
SAUL GOTTLIEB
BY
ATTORNEYS Patented Mar. 31, 1936

2,036,038

UNITED STATES PATENT OFFICE 2,036,038

HYDRAULIC BRAKE SYSTEM

Saul Gottlieb, New York, N. Y., assignor to Supco Products Corporation, New York, N. Y., a corporation of New York Application July 17, 1934, Serial No. 735,554

3 Claims. (Cl. 309—33)

The present invention relates to hydraulic brake systems and it particularly relates to improvements in the construction of master cylinders for hydraulic brake systems.

In hydraulic brake systems, a fluid is usually forced into a series of conduits leading to piston-cylinder combinations of each of the wheels, the fluid being forced into the lines by a central master cylinder-piston combination. The master cylinder is usually combined with or positioned close to a reservoir so that it will be maintained full of fluid and upon release of the brakes the piston of the master cylinder is returned by resilient means compressed upon the braking stroke.

In designing the master cylinders considerable difficulty is met in having the pistons of the master cylinder returned promptly upon release of the brakes, without suction being exerted upon the lines leading to the brakes and without there being any possibility of air or foreign substances being drawn into the lines.

In designing a master cylinder which will function most satisfactorily in hydraulic brake systems it has been found desirable to provide separable packing cup members, the packing cup in the preferred construction consisting of a rubber disc with an outwardly extending peripheral flange around the edge of the rubber disc, the disc being designed to seat closely upon the face of the piston.

These packing cups, which may be of rubber or other flexible material preferably cooperate with the piston to interrupt communication between the master cylinder and the fluid reservoir at the beginning of the bracking movement of the piston. They are also designed to facilitate the passage of fluid or liquid thereby during the retraction of the piston.

Furthermore, these rubber packing cups permit the piston to retract freely and admit the liquid or fluid to the master cylinder in greater quantities than is actually required for operation, the surplus liquid being discharged into the reservoir by the retraction of the brake cylinders until the proper quantity of fluid remains in the cylinder.

In designing these flange rubber cups for utilization in master cylinders, it has not been found satisfactory to provide merely a combination of peripheral and axial grooves over spaced portions of the flange adjacent the base disc.

Many difficulties are encountered with these widely spaced grooves since they do not properly cooperate with the piston to interrupt communication between the master cylinder and fluid reservoir at the beginning of the projectile movement nor do they facilitate passage of liquid past the rubber cup during the retraction of the piston.

It is the object of the present invention to so design these packing cups that they will most advantageously cooperate with the master cylinders to achieve the desired purposes above stated and this has been most satisfactorily accomplished by reducing the external diameter of the packing cup adjacent the junction of the peripheral flange and disc-like base.

This reduction may take the form of a step shoulder or it may be gradually initiated by curving the rear face inwardly. It may also be obtained by providing a plurality of closely spaced peripheral grooves in the cup. In any case, it is preferably attained without the use of axial grooves.

The above and other objects will appear more clearly from the following detailed description, when taken in connection with the accompanying drawing, which illustrates preferred embodiments of the inventive idea.

In the drawing:

Figure 1 is a schematic illustration of a hydraulic brake installation including a master cylinder.

Figure 2 is a side elevation, partly in section, of the master cylinder.

Figure 3 is a transverse sectional view of the rubber or other packing cup.

Figure 4 is a rear view taken in the direction indicated by the arrow 4 of Fig. 3.

Figure 5 is a cross sectional view of another embodiment of packing cup taken upon the line 5—5 of Fig. 6.

Figure 6 is a rear view of the packing cup taken in the direction of the arrow 6 of Fig. 5.

Figure 7 is a cross sectional view of still another embodiment.

Referring to Figs. 1 and 2, in general the hydraulic braking system includes a reservoir or tank A, for the actuating fluid or liquid, a master cylinder B, a master piston C, conduits D leading to the wheels E, each of which is provided with a subsidiary cylinder-piston diagrammatically indicated at F. The master piston C is actuated by the foot pedal G.

Referring specifically to Fig. 2, the container A may be held on any suitable support 10 and is preferably provided with the straps 11 which are riveted or otherwise attached to the straps 10. To the bottom of the reservoir 13, is connected the conduit 14 which is connected to the top of the master cylinder B, as indicated at 15.

The master cylinder B is provided with the cylindrical body 16 which has a system valve 17 connecting with the piping system D and another connection 18 and 19 with the conduit 14 leading to the reservoir A.

The valve 17 is preferably of such construction that it will continually maintain a slight positive pressure on the piping system D, causing any suction of the piston C to be relieved by fluid or liquid from the reservoir A. This feature is particularly desirable where the rear springs of the piston cylinder combinations at the wheel do not function quickly to force fluid from the lines D into the master cylinder B to fill the volume left upon retraction of the piston B.

The piston C has two cylindrical end portions 20 and 21, and is intermediately recessed, as indicated at 22. The piston is also provided with an axial recess 23, the inner portion of which is formed as a socket 24 to receive the end 25 of the rod 26, which is pivotally connected at 27 to the depending lever 28 actuated by the foot pedal. The bracket 29 is pivotally supported at 30. The connection of the rod 26 to the master cylinder B is protected by the collapsible enclosure 34, which readily permits forward and backward movement of the rod 26 under the influence of the lever 28. The forward part of the piston is provided with the small passages 31 which are peripherally arranged around the cylindrical piston element 20.

The rubber cup 32 which forms a primary feature of the present invention, is adapted to seat at its lower disc-like portion 33 upon the face of the piston. Upon retraction of the piston B the rubber cup 32 is designed to function to permit the suction to be relieved both through the valve 17, establishing connection between the master cylinder B and the lines D and past the flanges 35 of the rubber cup. At the same time upon forward movement of the piston to apply the brakes, leakage past the piston C will be prevented by the close connection between the peripheral flange 35 of the rubber cup 32 and the walls of the master cylinder B.

To assure this double function of the rubber cup 32 it has been found desirable to form the flange of the rubber cup so that a portion thereof will have the same diameter as and closely contact the internal peripheries of the master cylinder body 16, as indicated at 36 in Figs. 3 and 4, while another portion will be of decreased dimension, as indicated at 37 in Figs. 3 and 4, to permit ready leakage upon the return movement of the piston C.

This leakage action which will cooperate with the valve 17 in preventing negative pressure upon the lines D, is further assisted by the bores 31 through the cylindrical element 20 of the piston C.

Preferably, the portion of reduced diameter 37 extends at least half-way the length of the peripheral flange 35, but in any case, the portion of reduced diameter should extend over one-third of the length of said flange and, desirably, should not extend over two-thirds from the base of the cup.

In the construction shown in Figs. 5 and 6, and in Fig. 7, similarly functioning parts to those shown in Figs. 3 and 4, are designated by the same numerals respectively provided with a superior prime and a superior 2.

In the embodiment of Figs. 5 and 6, the plurality of parallel closely spaced grooves 37' function similarly to the respective grooves of the embodiment of Figs. 3 and 4 and assist the leakage of liquid upon reverse movement of the piston C.

In the embodiment of Fig. 6 the bevelled-off portion $37^2$ serves a similar purpose.

By utilizing the cups in combination with other elements specifically described in connection with Figs. 1 and 2, which will permit ready retraction of the master cylinder with pressure on the line, regardless of the action of the spring on the subsidiary wheel cylinders, at the same time it will be possible to admit a fluid to the master cylinder in greater quantities than is actually required for operation, with assurance that the surplus liquid so admitted will be discharged into the reservoir by retraction of the brake cylinders until the proper quantity of fluid remains in the brake and master cylinder.

Referring particularly to Fig. 2 it will be noted upon the forward stroke of the piston C that the fluid is cut off shortly after the initiation of said movement, assuring that the volume of the master cylinder casing 16 will be discharged into the lines D. Upon return, the spring 38 will tend to force the rubber cup to follow the cylindrical element 20 and piston C upon this return movement. However, fluid may be supplied to fill the master cylinder C in front of the piston through the valve 17 from the lines D and through the ports 18 and 19. It will be noted that the port 18 communicates with the return of the cup 18 through the bores 31 and that the communication between the port 18 and the master cylinder B is maintained throughout movement of the piston C by the recess 22. When the piston C returns to the end of its stroke and when the rubber cup 22 is pressed home by the spring 38, any further fluid forced into the cylinder 16 by the piston at the wheels will flow back to the reservoir A by the line 19, and through the port 14.

During the return movement of the piston C it is possible that the rubber cup may be separated by the piston with the space between the rubber cup 32 and disc 20 being filled through the recess 22 and the bores 20.

However, the spring 38 will subsequently set the cup 32 against the piston, either permitting leakage past its flange 35 or return flow through the pipe 14 by way of the bores 31 and the recess 22.

What is claimed is:

1. In a master cylinder of a hydraulic brake system consisting of the type having a cylinder and a piston therein with an actuating face; a rubber cup shaped packing member having a disk shaped base to contact said actuating face of the piston and having an outwardly extending peripheral side flange to contact the interior sides of the cylinder, said side flange being provided with a plurality of parallel circumferentially extending grooves adjacent said base.

2. In a master cylinder of a hydraulic brake system consisting of the type having a cylinder and a piston therein with an actuating face; a rubber cup shaped packing member having a disk shaped base to contact said actuating face of the piston and having an outwardly extending peripheral side flange to contact the interior sides of the cylinder, said side flange being provided with three parallel circumferentially extending grooves adjacent the base thereof.

3. In a master cylinder of a hydraulic brake system consisting of the type having a cylinder and a piston therein with an actuating face; a rubber cup shaped packing member having a disk shaped base to contact said actuating face of the piston and having an outwardly extending peripheral flange to contact the interior sides of the cylinder, said actuating face being provided with a plurality of openings therein and said base being adapted to seal said openings upon pressure stroke by said piston, and said peripheral flange being of decreasing diameter toward said base and being provided with a plurality of parallel circumferentially extending grooves adjacent said base.

SAUL GOTTLIEB.